Nov. 24, 1970     A. L. WILLIAMS ET AL     3,542,990

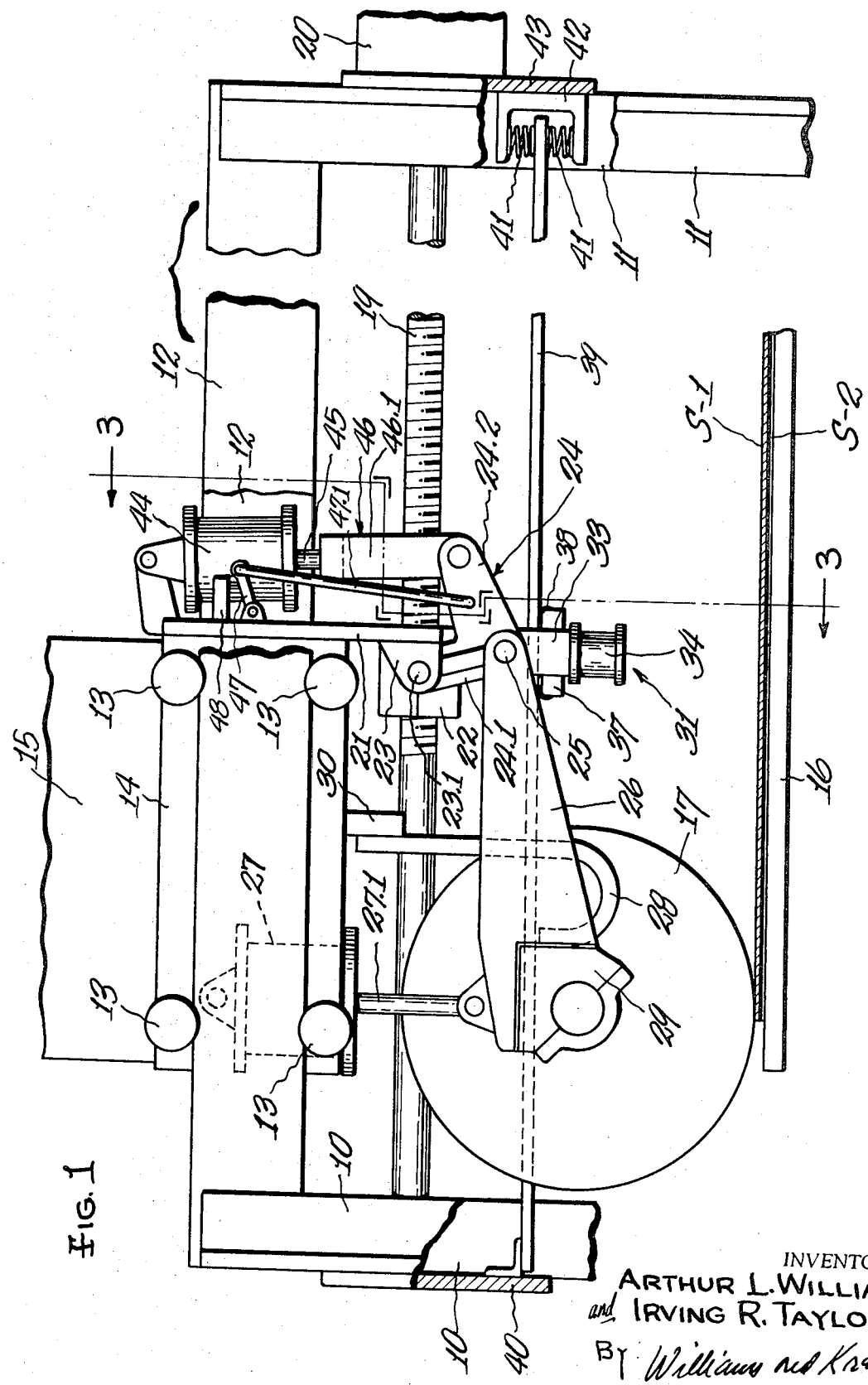

WELDING APPARATUS

Filed Oct. 8, 1968     3 Sheets-Sheet 2

INVENTORS
ARTHUR L. WILLIAMS
and IRVING R. TAYLOR

By Williams and Kreske
ATTORNEYS

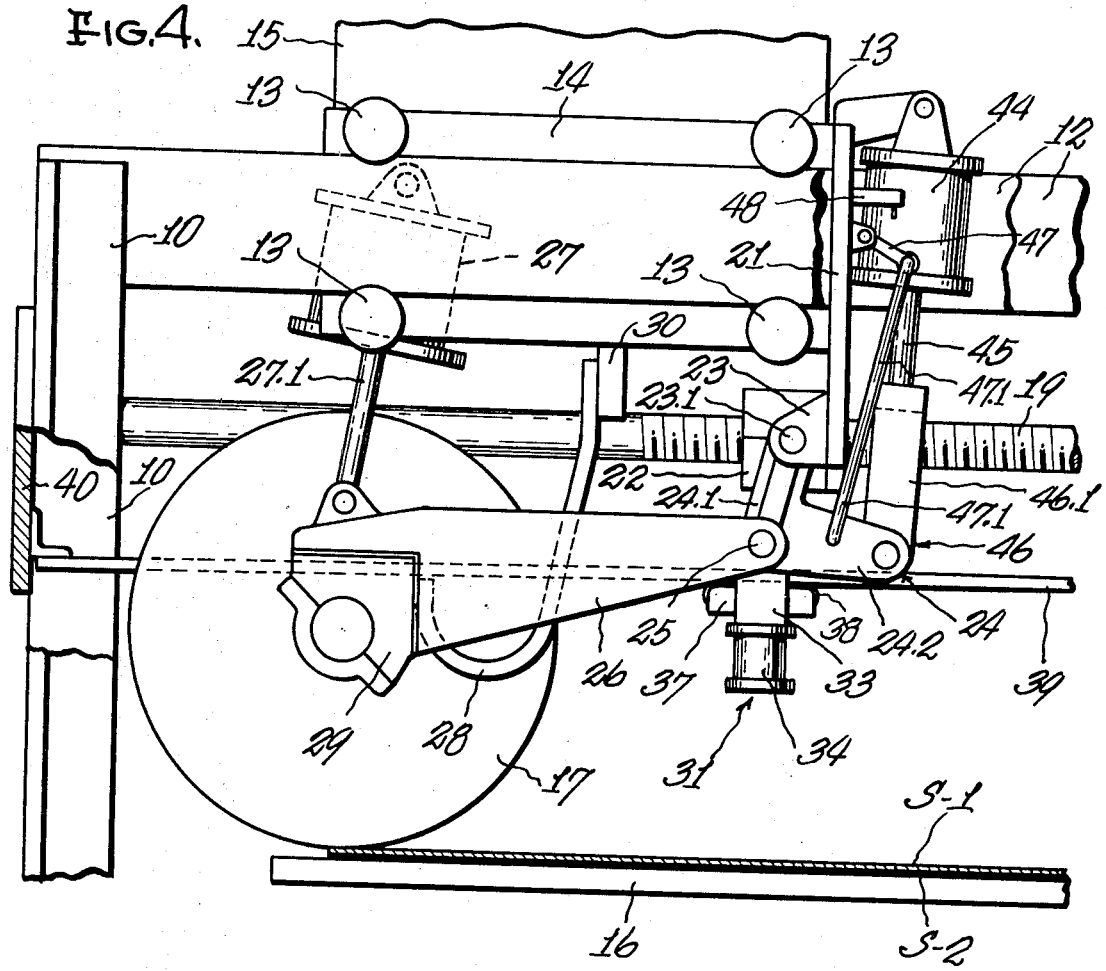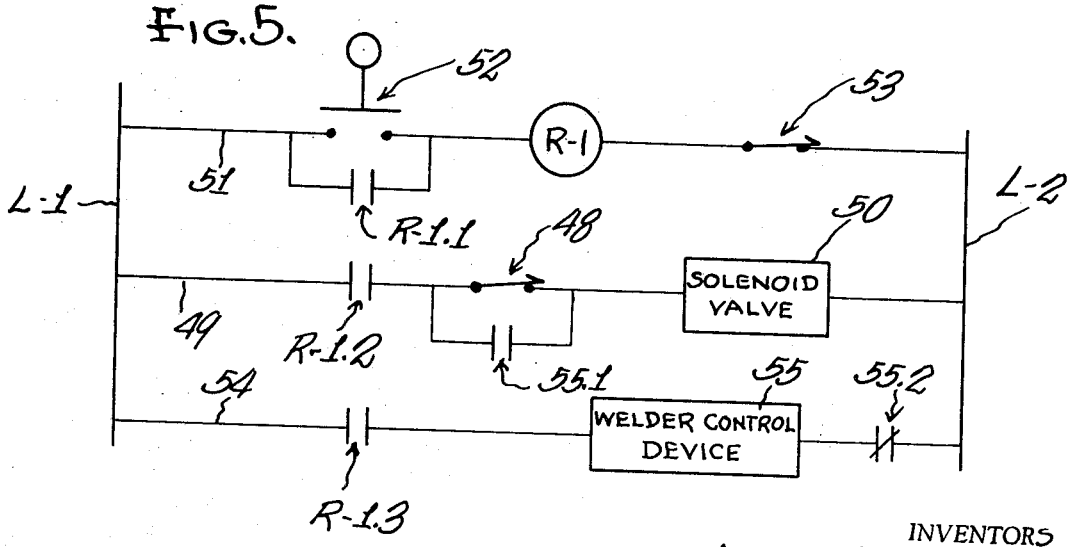

United States Patent Office 3,542,990
Patented Nov. 24, 1970

3,542,990
WELDING APPARATUS
Arthur L. Williams and Irving R. Taylor, Warren, Ohio, assignors to The McKay Machine Company, Youngstown, Ohio
Filed Oct. 8, 1968, Ser. No. 765,806
Int. Cl. B23k 11/06
U.S. Cl. 219—82                     10 Claims

ABSTRACT OF THE DISCLOSURE

Apparatus for forming successive, individual welds in a workpiece and providing a carriage movable uninterruptedly in a predetermined path of travel relative to the workpiece. The carriage mounts a welding transformer and electrode wheels, the latter having electrical connection with the transformer and being engaged with the workpiece for passing welding current therethrough. The electrode wheels are movable relative to the carriage along the travel path and a brake device momentarily interrupts electrode movement with the carriage while an individual weld is made by passing welding current to and through the workpiece. After a weld is completed, the brake device releases the electrodes and a motor device re-establishes movement of the electrodes with the carriage but at a momentary rate to cause the electrodes to recover the travel lost while their movement was interrupted.

PREAMBLE

The practice of welding a pair of superposed workpieces together by traversing them with roller electrodes while continuously passing welding current through the workpieces via the electrodes has long been known. It has also long been recognized that if welding current is fed intermittently through the workpieces, a series of spot welds rather than a continuous seam weld will be made.

When forming a series of spot welds as above mentioned, it has been found that better individual welds will be made if the electrodes are stationary while welding current is passed through the workpieces and, for a short time thereafter, to allow the weld-softened, workpiece material to harden.

Heretofore, the roller electrodes have been mounted on a carriage which also mounted the welding transformer and such carriage was intermittently moved along the workpieces to be welded. While prior art apparatus has been reasonably satisfactory where carriage movement was relatively slow and where carriage mass was relatively small, problems have arisen where the carriage is massive, as for supporting a large welding transformer, because of the large mass which must be intermittently moved and stopped at rapid intervals. The problem is compounded, of course, as the speed of movement of the carriage increases and as the distance between adjoining welds decreases.

SUMMARY OF THE INVENTION

Present day requirements for high production welders are such that prior art designs of welders capable of forming a series of spot welds in succession are wholly unsuitable for many requirements. It is, therefore, a primary object of the present invention to provide welding apparatus of the above character which is more economical to manufacture and maintain, and which operates more rapidly and with greater precision than prior art welders.

The above and other objects are carried out by obviating the previous necessity of continually stopping and starting a heavy carriage by the simple expedient of moving the carriage and its heavy transformer at a constant rate while only the relatively light-weight electrodes mounted on the carriage are stopped while each weld is made.

These and other objects of the present invention will readily become apparent from a study of the following specification and from the drawings forming a part of this application, and in these drawings:

DRAWING DESCRIPTION

FIG. 1 is a fragmentary, broken, side elevational view of apparatus embodying the present invention, FIG. 2 is a reduced-size perspective view illustrating material joined by the present invention, FIG. 3 is a sectional view generally corresponding to the line 3—3 of FIG. 1, FIG. 4 is a view like FIG. 1 but showing the parts positioned at another stage of operation, and FIG. 5 is a diagrammatic view showing circuitry and devices which may be used to control operation of the apparatus herein disclosed.

DETAILED DESCRIPTION

Although the present invention will be disclosed for use in joining a pair of overlapped ends of metal strips S-1 and S-2 as best seen in FIG. 2, it is to be understood that the invention is applicable to other uses as well.

With reference to FIGS. 1 and 3, the present invention provides a frame structure of upright members 10, 10 and 11, 11 supporting a pair of co-extending rails 12, 12 in spaced, side-by-side relation. Movable along the rails 12, 12 as on flanged rollers 13, is a carriage 14 on which is mounted a conventional welding transformer 15 as well as other mechanisms later to be described.

Suitably supported by the frame beneath the carriage 14 and extending along its path of travel along the rails 12 is a fixedly positioned, lower electrode or shunt bar 16 adapted to underlie the overlapped portions of strips S-1, S-2. Although not shown, suitable clamps may retain such strips in the required, overlapped relation illustrated while they are traversed by a pair of electrode wheels 17, 18 carried by the carriage. As will later be disclosed in greater detail, welding current will pass from one of the weld wheels 17, 18 through the overlapped strips to the shunt bar 16, and from the latter through the overlapped strips to the other of the weld wheels. In passing through the overlapped strips, the welding current will cause such strips to become welded together.

The means presently provided for effecting movement of the carriage 14 along the rails 12 comprises a rotatably mounted, externally threaded screw 19 adapted to be rotated by any suitable drive device 20. Device 20 will preferably be capable of rotating screw 19 at various speeds. Depending from the right end of carriage 14 in the position of parts seen in FIG. 1 is a plate 21 to whose lower portion is affixed an internally threaded nut member 22 through which the screw 19 passes.

Pivotally attached to the lower end of plate 21 on opposite sides of the nut member 22 by means of brackets 23 and respective, aligned pivot pins 23.1 are a pair of links 24 each having a main link portion 24.1 and a transversely projecting arm portion 24.2. A pivot pin 25 extends between the lower ends of the main link portions 24.1 and, pivotally mounted on respective ends of pin 25 are respective electrode wheel support arms 26. As best seen in FIG. 3, each wheel support arm 26 is bifurcated at 26.1 to straddle respective main link portions 24.1. The free end of one of the support arms 26 rotatably supports the electrode wheel 17 while the other support arm 26 in a similar manner rotatably supports the electrode wheel 18.

As best seen in FIG. 1, means are provided for biasing the electrode wheels 17, 18 to forceable engagement with the underlying, overlapped strips S-1, S-2 and in the present embodiment, a pair of air cylinders 27 are pivotally secured to the carriage 14 above the free ends of arms 26 and have piston rods 27.1 pivotally connected to respective, underlying arms. When air pressure is admitted to the rod ends of cylinders 27, both electrode wheels will be raised from the positions seen in FIG. 1 to allow free movement of the strip portions therebeneath and when air pressure is admitted to the blank ends of such cylinders, the electrode wheels will be forced onto the underlying strips (as shown) with a force proportional to the degree of air pressure used.

While only the cylinder 27 connected to the arm 26 mounting the near side electrode wheel 17 is seen in FIG. 1, it will be appreciated that the air cylinder 27 connected to the arm mounting the far side electrode wheel 18 is directly behind and is thus masked by the first mentioned cylinder.

Still referring to FIG. 1, means are provided for electrically connecting the electrode wheel 17 to the welding transformer 15 and as herein disclosed, flexible conductor member 28 of the usual type extends from a current-carrying journal block 29 (which mounts the wheel 17 to its arm 26) to a depending transformer output terminal 30. Although hidden behind the parts hereinabove described, an identical construction connects the electrode wheel 18 to the opposite transformer output terminal.

As best seen in FIG. 3, a clamp assembly 31 is pivotally secured to the previously described pivot pin 25 intermediate the electrode wheel support arms 26. Such assembly is shown to comprise a main body portion 32 having spaced, depending ears 33, 33 whose lower ends are bridged by an upright air cylinder 34 having a piston rod 35. Portion 32 of the clamp assembly provides a downwardly directed clamp surface preferably faced with a high-friction material 36 such as brake lining.

Secured to piston rod 35 is a cross-head 37 mounting a pair of spaced-apart rollers 38, 38 and interposed between the cross-head rollers 38 and the friction material 36 is an elongated bar 39. The arrangement is such that when air pressure is admitted to the blank end of cylinder 34, cross-head 37 will force the bar 39 to engagement with the friction material 36.

With reference to FIG. 1, bar 39 has one end anchored to a plate 40 spanning the frame uprights 10, 10 while the other end of the bar is contained between compression springs 41, 41 mounted between the flanges of a channel 42 secured to a plate 43 spanning the frame uprights 11, 11. For reasons to appear the right end of bar 39 is thus permitted limited vertical movement within the channel 42.

Pivotally secured to the upper portion of the previously mentioned carriage plate 21 is an air cylinder 44 having a downwardly projecting piston rod 45 secured to an inverted, U-shaped member 46 having spaced legs 46.1. The free ends of legs 46.1 are pivotally secured to the free ends of respective link arm portions 24.2, the arrangement being such that air pressure at the rod end of cylinder 44 exerts a force yieldably retaining the links 24 in the position of parts seen in FIG. 1.

Still referring to FIG. 1, a short link 47 is pivoted to carriage plate 21 and its free end is connected to the near side link arm portion 24.2 by a connecting link 47.1. A limit switch 48 is mounted on the plate 21 in such position that its actuator will be engaged by the short link 47 when the parts are positioned as shown.

Limit switch 48 (see FIG. 5) is interposed in a circuit 49 extending across electrical power lines L-1, L-2. Also interposed in circuit 49 is the solenoid actuator 50 of a valve which controls flow of air pressure to clamp cylinder 34. Also extending across line L-1, L-2 is a circuit 51 in which is interposed a normally open, momentary contact start switch 52, the actuator coil of a relay R-1, and a normally closed limit switch 53 whose function will later appear. Relay R-1 has normally open contacts R-1.1 in a holding circuit about switch 52, normally open contacts R-1.2 in circuit 49, and normally open contacts R-1.3 in a circuit 54 across the lines L-1, L-2. Interposed in circuit 54 is the usual welder control device 55 which controls operation of the welding transformer 15 and such device controls operation of normally open contacts 55.1 in a holding circuit about limit switch 48 and normally closed, time delay contacts 55.2 in the circuit 54.

Assuming that the strip portions S-1, S-2 to be welded have been positioned on the shunt bar 16 in overlapped relation as seen in FIGS. 1 and 3 and that the blank ends of cylinders 27 are exposed to air pressure to force the electrode wheels 17, 18 downwardly, drive device 20 will be energized to rotate screw 19 in a direction to move the carriage 21 to the right as seen in FIG. 1. Since air pressure at the rod end of cylinder 44 maintains the links 24 in the position shown and since no air pressure at this time is present at the blank end of clamp cylinder 34, the electrode wheels 17, 18 will move to the right with the carriage.

When the electrode wheels have climbed onto the overlapped strip ends as illustrated in FIG. 1, the machine operator will momentarily press the start button 52. This will energize relay R-1 and close its contacts R-1.1, R-1.2 and R-1.3. The closing of R-1.1 will complete a holding circuit around the switch 52 to retain the relay energized after the start button is released. The closing of contacts R-1.2 will energize, through the closed contacts of limit switch 48, the solenoid valve 50 thus exposing the blank end of clamp cylinder 34 to air under pressure. Cylinder 34 will thus press the bar 39 against the friction material thereby locking the clamp assembly 31 to such bar and interrupting further movement of the electrode wheels with the carriage.

The closing of relay contacts R-1.3 will energize the welder control device 55 which will close contacts 55.1, thus maintaining solenoid valve 50 energized independently of limit switch 48, and simultaneously initiate a welding cycle to cause welding current to flow between the electrode wheels through the overlapped strip portions. With electrode wheel movement to the right arrested but with uninterrupted movement to the right of carriage 14, the links 24 will pivot in a clockwise direction, as seen in FIG. 4, against the yieldable force exerted by the air cylinder 44.

When a welding cycle has been completed (FIG. 4) as determined by the welder control device, the contacts 55.2 in circuit 54 will momentarily open and this will open the contacts 55.1 in the holding circuit about the now open limit switch contacts 48. The opening of contacts 55.1 will de-energize the solenoid valve 50 thus exhausting the air from cylinder 34 to release the clamp assembly from the bar 39. With the release of the clamp assembly, the force exerted by cylinder 49 will swing the links 24 and the parts connected thereto from the position seen in FIG. 4 to the position of FIG. 1 once again. With the parts re-positioned as seen in FIG. 1, limit switch 48 will be closed by the short link 47 thus initiating another cycle of welding operation as just described.

When the electrode wheels have traversed the strip, limit switch 53 will open thus de-energizing relay R-1 and opening its contacts R-1.1, R-1.2 and R-1.3. The electrode wheels may now be raised clear of the strip by operation of the cylinders 27 as previously described while the carriage is returned to the left to await the next series of welding cycles.

From the foregoing, it will be evident that each time the electrode wheels stop, a spot weld is made by respective wheels as indicated at X in FIG. 2. While successive spot welds are shown in FIG. 2 as being spaced some distance apart, it is to be understood that the spacing between welds is primarily a function of carriage speed and weld cycle time and, if desired, successive welds may be spaced further apart or closer together. Indeed, the spacing between successive welds may, if desired, be so slight that in effect, a continuous seam weld is made. Moreover, while the present apparatus employs a pair of electrode wheels in side-by-side relation combined with an underlying shunt bar to form a double row of successive spot welds in interpositioned material to be welded, it will be apparent that apparatus embodying the invention may form a single row of successive spot welds as by employing a single electrode wheel which traverses the material to be welded.

We claim:

1. Welding apparatus in which a carriage mounts a welding electrode which moves with said carriage along a predetermined path of travel relative to a workpiece, the improvement comprising,
    means for effecting uninterrupted movement of said carriage along said travel path,
    means providing for relative movement between said electrode and said carriage along said travel path,
    means for momentarily interrupting movement of said electrode with said carriage thus causing said electrode to lag behind said carriage, and
    means for re-establishing movement of said electrode with said carriage but at momentary rate to cause said electrode to recover the travel lost during movement interruption aforesaid.

2. The construction of claim 1 and further comprising means for effecting flow of welding current between the workpiece and said electrode solely during interruption of electrode movement aforesaid.

3. The construction of claim 1 wherein said welding electrode is a wheel which rolls along the workpiece during electrode movement with said carriage along said travel path.

4. The construction of claim 3 and further comprising means for effecting flow of welding current between the workpiece and said electrode wheel solely during interruption of electrode movement aforesaid.

5. The construction of claim 1 wherein a pair of welding electrodes of wheel-like configuration are mounted on said carriage,
    wherein said electrodes engage the workpiece and roll therealong during electrode movement with said carriage along said travel path, and
    wherein a welding transformer is mounted on said carriage and has electrical connection with respective electrodes aforesaid.

6. The construction of claim 1 wherein an elongated member extends along the path of electrode travel and is anchored against movement along such path, and
    wherein said electrode movement interrupting means intermittently locks said electrode to said member.

7. The construction of claim 1 wherein a link swingably connects said electrode to said carriage for relative movement aforesaid, and
    wherein means yieldably opposes swinging movement of said link and consequent movement aforesaid of said electrode relative to said carriage.

8. The construction of claim 1 wherein a link has a first portion pivotally connected to said carriage and a second portion pivotally connected to said electrode whereby swinging movement of said link provides for relative movement aforesaid between said carriage and said electrode,
    wherein an elongated member extends along the path of electrode travel adjacent said link second portion and is anchored against movement along such path,
    wherein clamp means intermittently locks said link second portion to said elongated member to interrupt electrode movement with said carriage, and
    wherein means yieldably opposes link swinging movement in one direction and consequent electrode movement in one direction relative to said carriage.

9. The construction of claim 8 wherein said means last-mentioned comprises a fluid cylinder.

10. The construction of claim 1 wherein a link depends from said carriage and has a first portion pivotally connected to the latter and a second portion pivotally connected to a pair of welding electrodes of wheel-like configuration which underlie said carriage whereby swinging movement of said link provides for relative movement aforesaid between said carriage and said wheel-like electrodes,
    wherein said wheel-like electrodes engage the workpiece and roll therealong during electrode movement with said carriage along said travel path,
    wherein a welding transformer is mounted on said carriage and has electrical connection with respective wheel-like electrodes,
    wherein an elongated member extends along the path of electrode travel adjacent said link second portion and is anchored against movement along such path,
    wherein a fluid cylinder yieldably urges said link and thus said electrodes to predetermined positions relative to each other, and
    wherein clamp means intermittently locks said link second portion to said elongated member to interrupt electrode movement with said carriage and thus cause relative movement between said carriage and said electrodes away from predetermined relative positions aforesaid against the urging of said fluid cylinder.

References Cited

UNITED STATES PATENTS 1,738,465 12/1929 Wagner et al. _____ 219—82
2,220,704 11/1940 Boles et al. _____ 219—82

JOSEPH V. TRUHE, Primary Examiner

H. D. JAEGER, Assistant Examiner

U.S. Cl. X.R.

219—78, 81, 86